US006612324B2

(12) United States Patent
Szlaga (10) Patent No.: US 6,612,324 B2
(45) Date of Patent: Sep. 2, 2003

(54) FILL LIMIT VAPOR VALVE WITH VARIABLE VAPOR VENTING CAPABILITY

(75) Inventor: Emil Szlaga, Sterling Heights, MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

(21) Appl. No.: 09/811,791

(22) Filed: Mar. 19, 2001

(65) Prior Publication Data

US 2003/0116190 A1 Jun. 26, 2003

(51) Int. Cl.$^7$ ................................................ F16K 24/04
(52) U.S. Cl. ............................... 137/2; 137/43; 137/202
(58) Field of Search ................................ 137/43, 202, 2

(56) References Cited

U.S. PATENT DOCUMENTS

| 4,953,583 A | | 9/1990 | Szlaga ........................ 137/118 |
| 5,028,244 A | | 7/1991 | Szlaga |
| 5,261,439 A | | 11/1993 | Harris ......................... 137/43 |
| 5,443,561 A | * | 8/1995 | Sakata et al. ............... 137/202 |
| 5,449,029 A | * | 9/1995 | Harris ......................... 137/202 |
| 5,535,772 A | * | 7/1996 | Roetker et al. ............. 137/202 |
| 5,577,526 A | * | 11/1996 | Kasugai et al. ............. 137/202 |
| 5,666,989 A | | 9/1997 | Roetker ........................ 137/43 |
| 5,687,756 A | * | 11/1997 | VanNatta et al. ............ 137/202 |
| 5,687,778 A | | 11/1997 | Harris .......................... 141/59 |
| 5,711,339 A | * | 1/1998 | Kurihara ...................... 137/202 |
| 5,950,659 A | * | 9/1999 | Szlaga et al. ............... 137/202 |
| 6,016,827 A | * | 1/2000 | Dawson ....................... 137/202 |
| 6,240,950 B1 | * | 6/2001 | Harris ......................... 137/202 |

OTHER PUBLICATIONS

INTERNATIONAL SEARCH REPORT FOR APPLN PCT/US 02/08599.
Japanese Abstract 2000016097 published Jan. 18, 2000.

* cited by examiner

Primary Examiner—Gerald A. Michalsky
(74) Attorney, Agent, or Firm—Rader, Fishman & Grauer PLLC (57) ABSTRACT

A fill limit vapor valve assembly includes a housing, a float disposed in the housing, and a bypass valve. The bypass valve includes a vertical passage enveloping a weighted metering rod. The includes a substantially cylindrical upper portion, a substantially cylindrical bottom portion, and a seat portion that rests on a shoulder of the float. As the float raises and lowers, the substantially cylindrical upper portion varies the size of a second opening to control the flow rate of fuel vapor from the fuel tank to an emission device.

18 Claims, 7 Drawing Sheets

FILL LIMIT VAPOR VALVE WITH VARIABLE VAPOR VENTING CAPABILITY

FIELD OF THE INVENTION

The present invention relates to a fill limit vapor valve assembly for a vehicle fuel tank and, more particularly, to a fill limit vapor valve assembly that includes a bypass valve that varies the size of an opening in a housing skirt to control the flow rate of fuel vapor from the fuel tank as required to achieve the following: 1)minimize vapor flow from the tank during refueling "trickle-fill" operations to prevent overfilling the fuel tank, and 2)maximize vapor flow from the tank after multiple "trickle-fill" nozzle shutoffs (NSO'S) to minimize tank pressures after refueling operations.

BACKGROUND OF THE INVENTION

The fill limit vapor valve (FLVV) assembly provided on current automotive fuel tanks typically has an internal fixed fuel vapor vent orifice to provide a flow passage from the fuel tank vapor space or dome to an emission apparatus, such as a charcoal canister, located external of the fuel tank. FLVV assemblies typically are designed with a mechanism to close the fixed fuel vapor vent orifice in the presence of liquid fuel, such as may occur at high static fuel levels in the fuel tank and from sloshing fuel in the fuel tank during vehicle movement. Closure of the fuel vapor vent orifice typically in the presence of liquid fuel at the valve assembly has been effected by a float biased with a spring load as required to achieve a buoyant force responsive to both static and dynamic fuel level changes. For instance, the float can have its upper region configured to include a nipple that when seated against the vent orifice will provide a liquid/vapor tight closure of the fuel vapor flow passage leading from the fuel vapor vent orifice to the charcoal canister.

The FLVV assembly (also commonly known as an ORVR valve assembly) includes a housing skirt configured with one or more upper flow windows located above the tank fuel level that is associated with 100% rated tank capacity. The size of the upper flow windows is used to control fuel level height at nozzle shutoff (NSO) during refueling operations and provide a flow passage through the housing skirt for fuel vapors when the bottom of the housing skirt is submerged in fuel.

Relatively large upper flow windows in the housing skirt are commonly used to minimize the difference in fuel level after the first NSO between low and high fuel dispensing rates during refueling operations, such as 2GPM and 12GPM. In summary, large flow windows virtually eliminate the ability to trickle fill because the vapor flow passage through the FLVV with be closed after the first NSO.

In the event of the operator needs to "round up" the cost of fuel to the nearest monetary unit, smaller flow windows in the housing skirt may be utilized to allow the addition of fuel during low fuel dispensing rates (commonly known as "trickle filling"); however, it is possible to overfill the tank during these multiple trickle-fill NSO's.

Whether using large or small flow windows in the housing skirt, the ability to add fuel after a NSO is determined by whether the fuel vapor vent orifice is closed or open after a NSO. If the fuel vapor vent orifice is open after a NSO, then fuel can be added to the tank by additional NSO's. The probability of the fuel vapor vent orifice to reopen after a NSO increases as the flow windows in the housing skirt become smaller.

It is known that the fuel level in the fuel tank, at which the fuel vapor vent orifice will close as the float rises, will decrease as the size of the flow windows in the housing skirt decreases. Theoretically, the tank fuel level at NSO will be virtually the same as the lower opening in the housing skirt when there is no flow windows at the upper end of housing skirt. This phenomena, the differences in fuel levels between that outside the housing skirt to the level inside the housing skirt, is what allows the vapor flow passage valve to cause the fuel vapor vent orifice to reopen as the flow windows in the upper portion of the housing skirt become smaller. Thus, small flow windows are required to allow the vapor flow passage valve to reopen the fuel vapor vent orifice after each NSO and to limit the addition of fuel during trickle fill operations.

However, the ability of the very small flow windows in the housing skirt to flow fuel vapor after refueling operations is limited and considered to be incapable of sufficient fuel vapor flow that is required to maintain minimal fuel tank pressure. Thus, the inventors of the present invention have discovered that there is a need to provide a means of increasing the vapor flow rate from the fuel tank to the vapor storage canister after the fuel tank has been filled to rated tank capacity as defined by multiple NSO's during trickle fill.

SUMMARY OF THE INVENTION

An object of the present invention is to provide a feature that will vary the effective window size located in the valve assembly housing skirt above the 100% rated tank capacity fuel level in such way that the window is closed when the tank fuel level covers the bottom opening in the housing skirt(to prevent trickle-fill) and opened after multiple NSO's to obtain minimal tank pressure after refueling operations.

In a particular illustrative embodiment of the invention, a fill limit vapor valve assembly comprises a housing including a housing skirt having first and second vent openings communicating with the interior of said fuel tank and with a fuel vapor emission device. The assembly includes a float disposed in the housing for movement in response to level of fuel. The assembly also includes a bypass valve in the housing for varying a size of the second vent opening, thereby controlling the flow rate of fuel vapor from the fuel tank to the fuel vapor emission device when the tank fuel level is above the bottom opening of the valve assembly skirt.

The bypass valve comprises a vertical passage enveloping a weighted metering rod. The weighted metering rod includes a substantially cylindrical upper portion, a substantially cylindrical bottom portion, and a seat portion that rests on a shoulder of the float. The substantially cylindrical upper portion is positioned at an elevation above the second vent opening when the float is positioned in an upward position, thereby allowing fuel vapor to pass through the second vent opening. The substantially cylindrical upper portion is positioned at approximately the same elevation as the second vent opening when the float is positioned in a downward position, thereby preventing fuel vapor to pass through the second vent opening. When the float is between the upward and downward position, the substantially cylindrical portion is portion to expose a portion of the second vent opening, thereby varying the size of the second vent opening.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
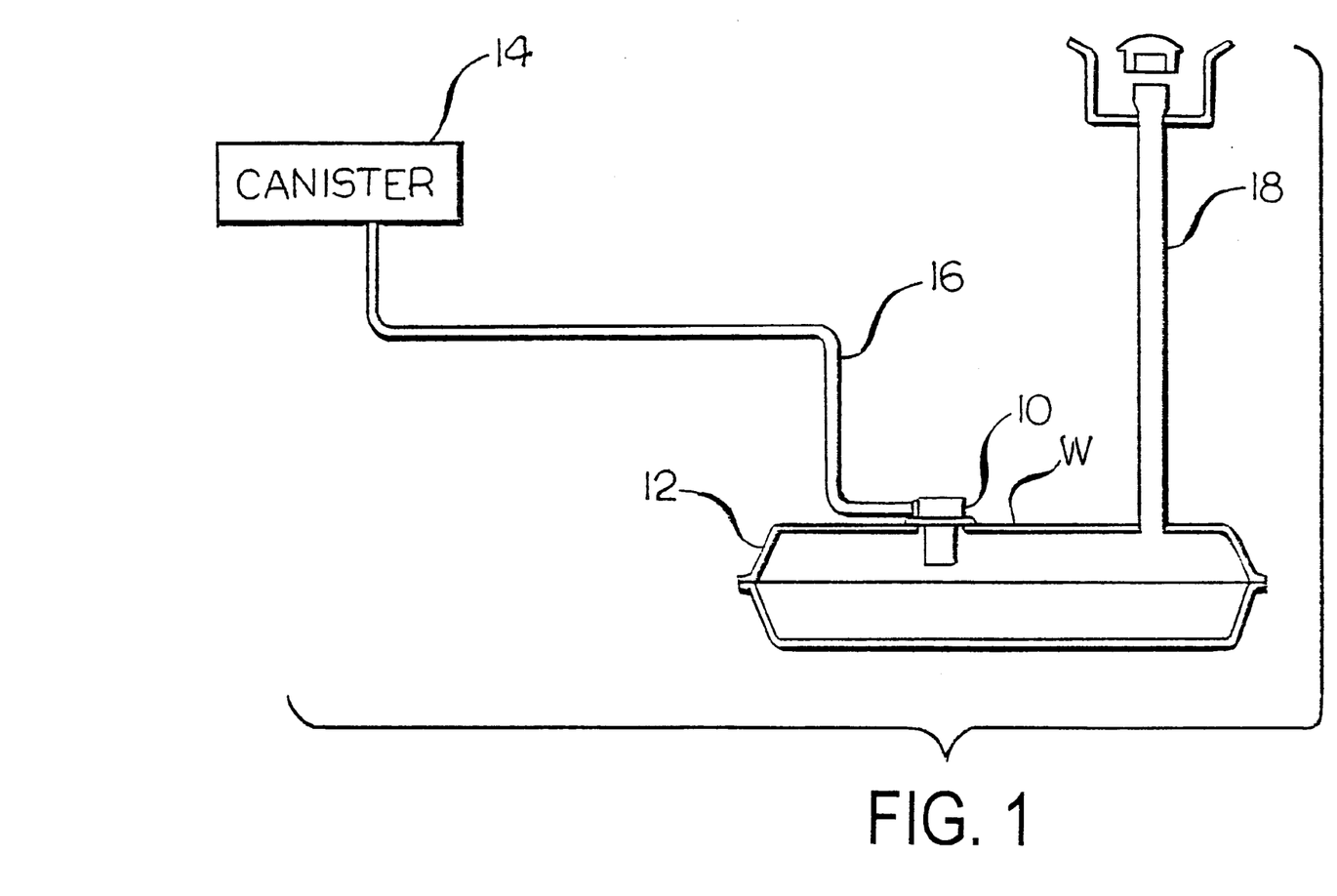
FIG. 1 is a schematic view of a vehicle fuel tank and related fuel system components showing a fill limit vapor valve assembly according to an embodiment of the invention.
Figure 2:
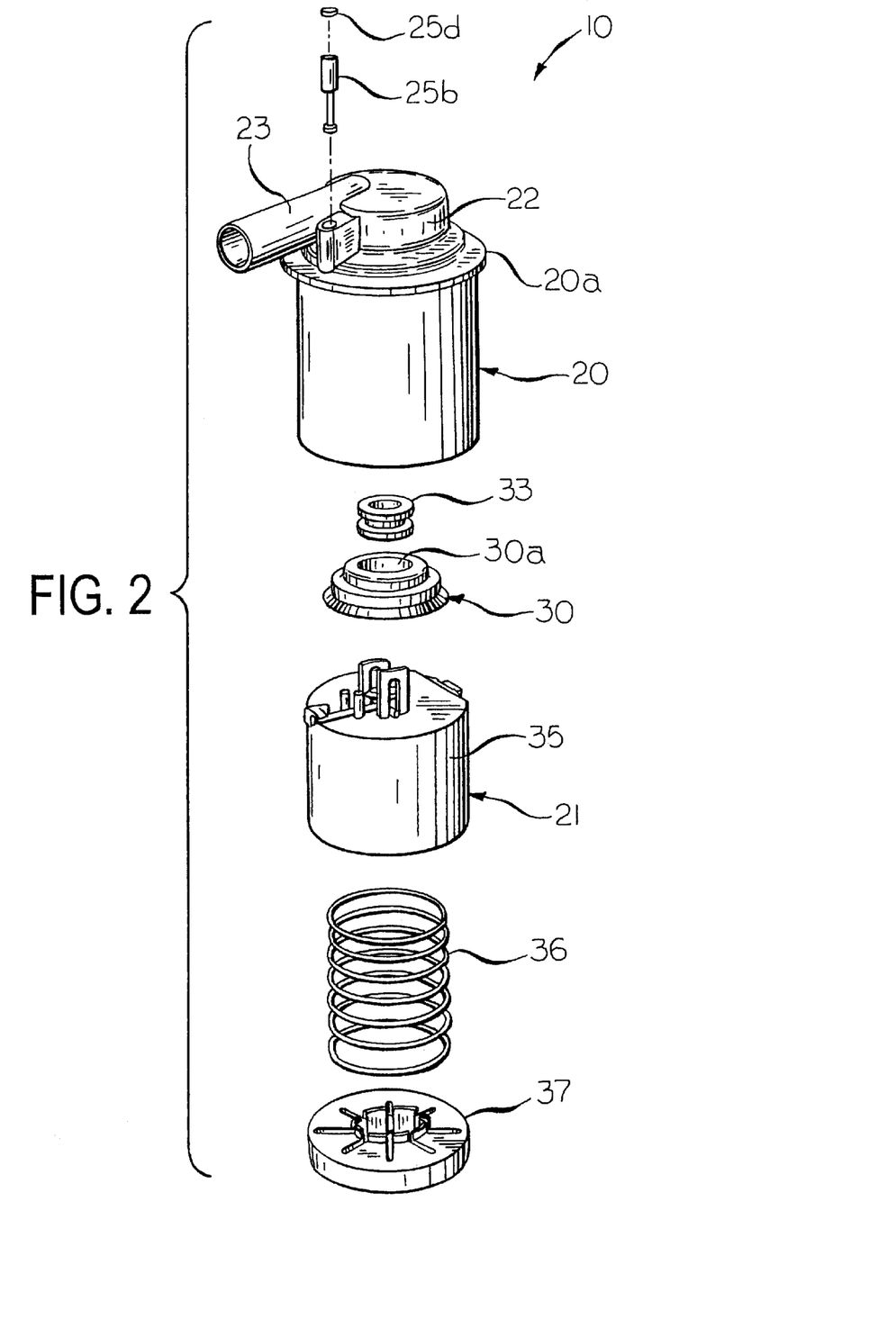
FIG. 2 is an exploded perspective view of the fill limit vapor valve assembly according to the embodiment of the invention.

Referring now to FIG. 1, there is illustrated a fill limit vapor valve (FLVV) assembly 10 for a vehicle fuel system. The FLLV assembly 10 vents fuel vapors from a conventional vehicle fuel tank 12 in a controlled manner to an emission device, such as a carbon canister 14, located external of the fuel tank via a conduit 16. The fuel tank 12 includes a conventional fuel fill pipe 18 connected thereto by which fuel is introduced into the fuel tank 12.

The FLVV assembly 10 functions to vent fuel vapor from the fuel tank 12 when the fuel level therein is at or below a certain level that typically corresponds to 100% rated tank capacity. When the fuel level in the tank is above that level (e.g. fuel sloshing in the tank or accidental vehicle rollover or severe vehicle tilt), the FLVV assembly 10 closes and functions to prevent liquid fuel from exiting the fuel tank and flowing into the canister 14.

Prior fuel vent valve assemblies with small skirt windows that eliminate overfilling the tank during "trickle-fill operations have experienced problems achieving the flow of fuel vapor after refueling operations that is required to maintain minimal fuel tank pressure. The present invention provides a FLVV assembly for a vehicle fuel tank that addresses and overcomes this problem by virtue of including a bypass valve mechanism.

Referring to FIGS. 2–7, a fill limit vapor valve (FLVV) assembly 10 in accordance with an illustrative embodiment of the invention is shown.

The FLVV assembly 10 comprises a tubular valve housing 20 having a peripheral lateral circumferential flange 20a that is attached to the wall W of the fuel tank 12 by mechanical connection, such as a grommet seal (not shown), adhesive, plastic welding, or other conventional attachment techniques. The housing 20 preferably is made of a fuel resistant plastic material such as, but not limited to, acetal resin, although metal or other materials may be used to this end.

The housing 20 defines a float chamber 21 therein proximate the lower region thereof located inside the fuel tank 12. A fuel limit vapor opening 22 is defined in an upper region of the housing 20. The vent opening 22 communicates to a lateral conduit 23 that is communicated to the canister 14 via conduit 16. The conduit 23 typically is molded integrally with the housing 20 although the invention is not so limited.

A valve seat-forming member 30 is disposed in the upper region of the housing 20 and forms a vent passage 30a communicating with the vent opening 22 and having a constricted passage section 30b whose cross-sectional size is selected to control flow rate of fuel vapors through the valve assembly. A vent valve seat 32 is formed on the member 30 and is described in further detail below. The vent valve seat 32 may be formed by use of a seal means 33, such as a rubber washer, that can be disposed within the constricted passage section 30b. The valve seat-forming member 30 is fastened to the housing 20 by conventional plastic welding techniques or may be molded integrally therewith.

The housing 20 includes one or more fuel limit vapor openings 20b in the upstanding cylindrical skirt or sidewall 20c thereof to communicate to the vapor space or dome of the fuel tank 12 to permit fuel vapor to enter the housing. Disposed in the housing float chamber 21 is a fuel level responsive float (valve-moving device) 35 that is freely movable up/down as the fuel level rises/falls in the fuel tank 12. To this end, the float chamber 21 communicates with liquid fuel in the fuel tank via openings 20d in the lower end of cylindrical sidewall and/or in the retainer 37. The housing 20 includes an inner wall 20e having a plurality of molded radially extending and circumferentially spaced apart (e.g. 45 degrees apart) guide ribs 39 extending axially along the housing 20 for positioning the float 35 away from the inner wall thereof. The inner wall 20e of the housing 20 may have a slight outward taper from top toward the bottom as required by the molding operation for core removal. The ribs 39 extend radially from the inner housing wall such that the inner rib surfaces collectively define the cylindrical float chamber 21 in the housing 20. The opening(s) 20b for fuel vapor communicate with the interior of the housing 20.

One aspect of the invention is that a portion 20f of the housing skirt 20c is designed to incorporate a bypass valve 25 comprising a vertical passage 25a enveloping a weighted metering rod 25b and a vent opening 25c. The rod 25b includes a substantially cylindrical upper portion 25d having an outer diameter slightly smaller than the inner diameter of the passage 25a, a substantially cylindrical bottom portion 25e having an outer diameter less than the upper portion 25d and slightly smaller than an orifice 25f formed by shoulder 25g of housing 20. To allow the rod 25b to move vertically within the passage 25a, the bottom of the rod 25b includes a seat portion 25h that is in vertical alignment to the shoulder 21a of the float 35. A plug 25i may be press fit or securely attached by any well-known means into the top of vertical passage 25a to seal the passage 25a.

The float 35 is made of fuel resistant material such as plastic material mentioned above for the housing 20 with the material having density equal to or greater than that of the liquid fuel in the fuel tank. The float 35 is biased in an upward direction by a coil spring 36 positioned between an apertured bottom housing spring retainer 37 snap fit on the housing 20 and an recessed upper internal wall 35*a* of the float. The spring 36 typically biases the float 35 upwardly with a sufficient biasing force to make it buoyant when submerged in the liquid fuel in the float chamber 21, although the invention is not so limited and can be practiced so long as the spring renders the float buoyant in the liquid fuel and is effective to close the vent valve assembly 10 in severe fuel sloshing, vehicle tilt situation or as assisted by gravity in a vehicle rollover situation.

A fill limit vapor valve 42 is disposed on the top of the float 35 in a manner for closing and opening the vent valve seat 32 in response to the fuel level in the fuel tank 12. The vent valve 42 includes an upper valve head having a partial spherical, radius-defined sealing surface 42*a* that mates with a sealing surface 32*a* of the vent valve seat 32 to provide liquid/vapor tight sealing relation therebetween when the valve 42 is in the closed position relative to the valve seat 32. In the illustrated embodiment, the valve seat sealing surface 32*a* has a frusto-conical configuration to provide a circumferential line of contact sealing with the valve sealing surface 42*a* to maintain low friction therebetween when the sealing surfaces 32*a*, 42*a* are in sealing relation. The valve seat sealing surface 32*a* is not limited to any particular configuration and may have a radius edge shape or other edge shape or any other configuration to provide a circumferential line of contact for sealing with the valve sealing surface 42*a*. The sealing surface 32*a* also may have a partial spherical configuration complementary to that of valve sealing surface 42*a*, although this may increase friction between the sealing surfaces 32*a*, 42*a*.

The vent valve 42 includes a cylindrical shaft or axle 44 about which the valve 42 and thus valve surface 42*a* is pivoted relative to the valve seat surface 32*a* in response to initial downward movement of the float 35 when the valve and valve seat surfaces 42*a*, 32*a* are in sealing relation as explained below. The valve sealing surface 42*a* is configured such that a small degree of rotating movement of the valve 42 in the valve seat 32 interrupts or breaks the sealing relation between sealing surfaces 42*a*, 32*a*, providing a vapor flow path that reduces the vapor pressure differential across the valve 42 to facilitate its reopening by further downward movement of the float 35. The rotating action of the valve 42 is described in co-assigned U.S. Pat. No. 5,950,659, the disclosure of which is herein incorporated by reference.

Figure 3:
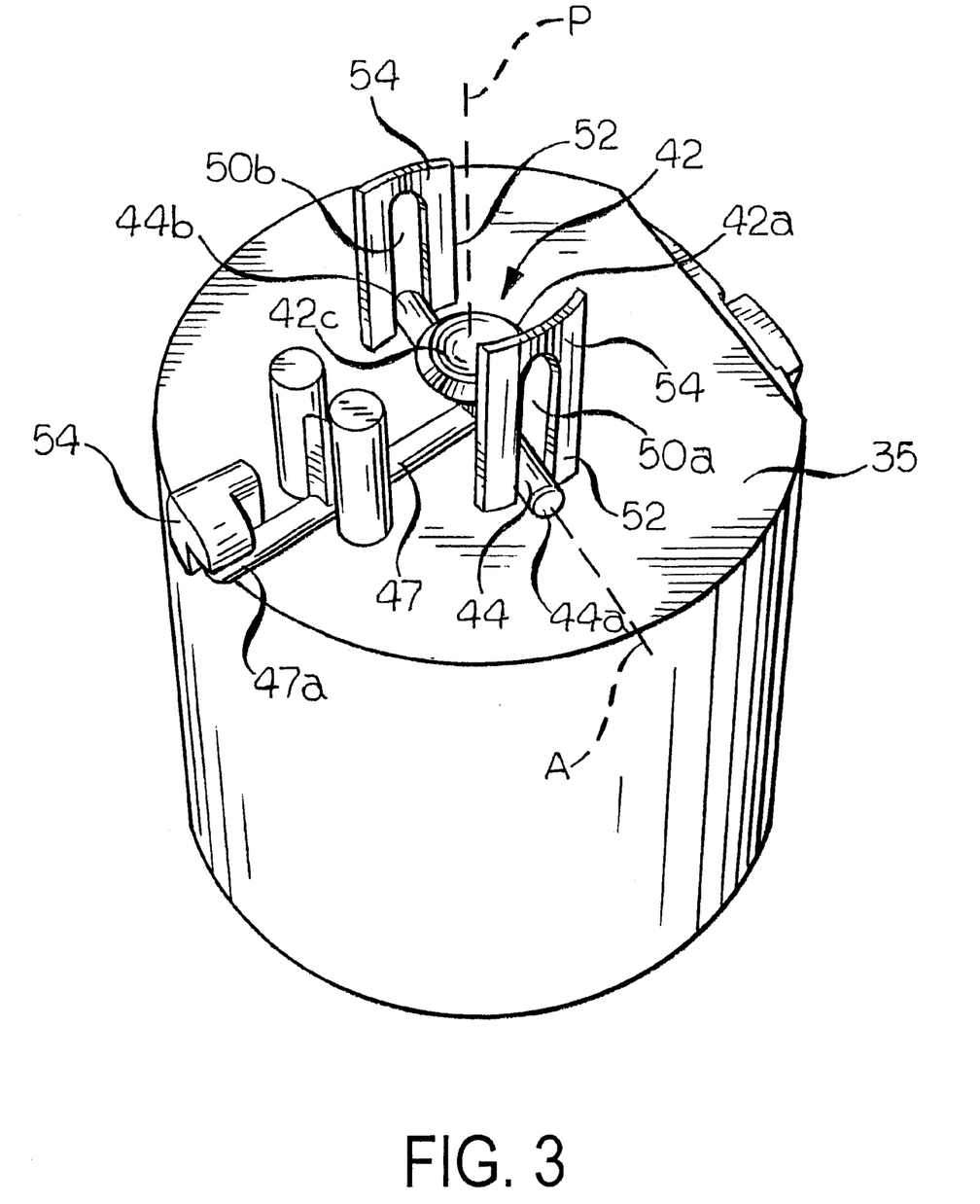
FIG. 3 is a perspective view of the float with a fill limit vapor valve disposed thereon for rotation about an axis of rotation defined by a valve axle or shaft received for axial movement in upstanding float slots.
Figure 4:
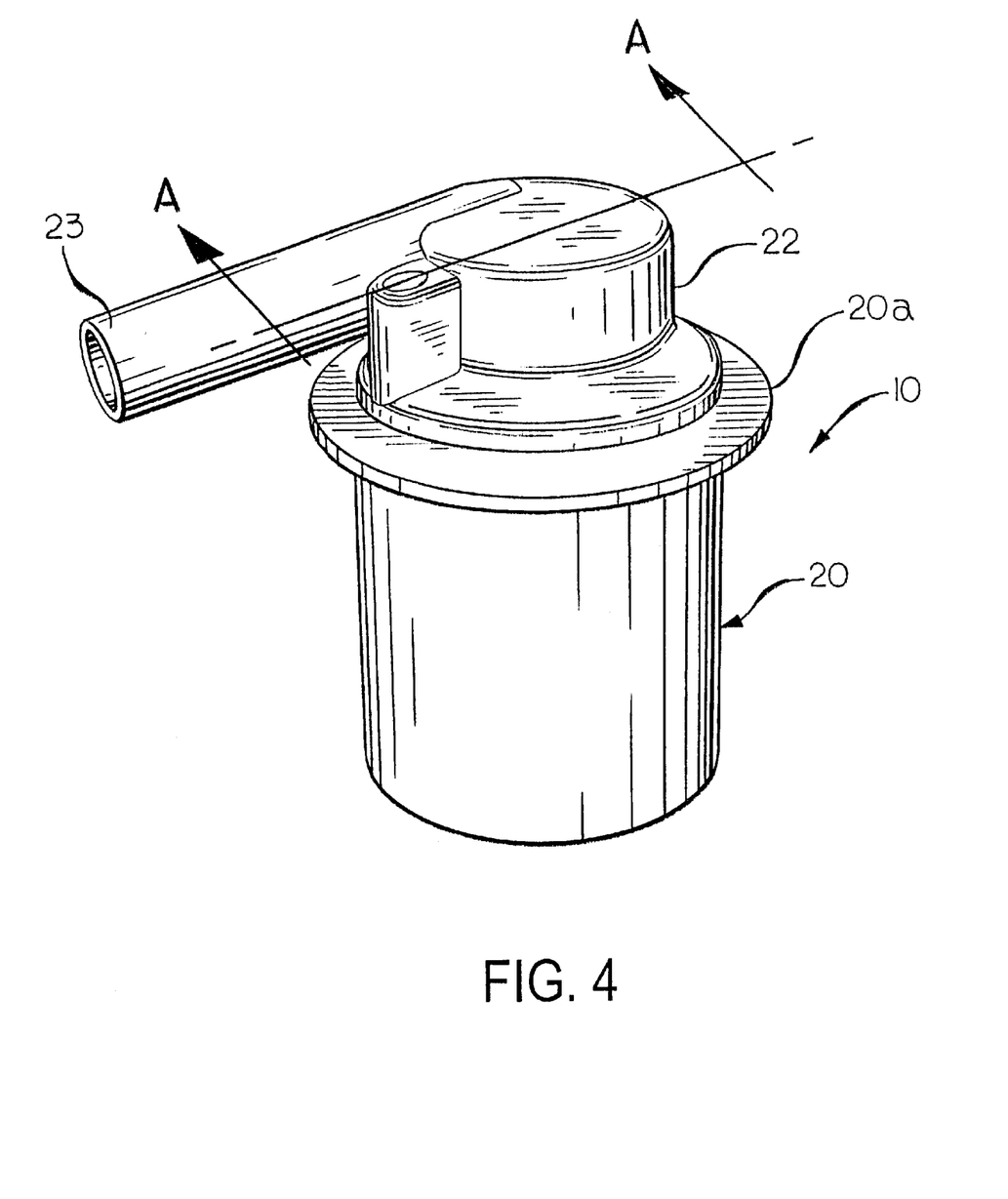
FIG. 4 is a perspective view of the fill limit vapor valve assembly according to the embodiment of the invention when fully assembled.

Referring to FIG. 3, the shaft or axle 44 includes ends 44*a*, 44*b* that reside in respective slots 50*a*, 50*b* extending upwardly from the float 35. The slots 50*a*, 50*b* are disposed between upstanding posts 52 interconnected at the top by an arcuate wall 54 and include selected width dimensions that maintain the longitudinal axis, A, of the axle 44 in proper position relative to the diametral plane, P, and center, C, and to apply a downward load or force on the shaft or axle 44 after sealing contact between the valve and valve seat surfaces 42*a*, 32*a* is broken or interrupted as described below.

The fill limit vapor valve 42 further includes an integrally molded lateral arm 47 that extends radially from the shaft or axle 44 through slot 52*a* extending upwardly from the float 35 as it moves downwardly to initially rotate the fill limit vapor valve 42 about the axle 44 to break the liquid/vapor tight seal between the valve and valve seat sealing surfaces 42*a*, 32*a*. The valve arm 47 includes an upturned end 47*a* to engage an arm 54 of the float 35. The float arm 54 comprises a generally inverted L-shape and typically is molded integrally on the float 35.

The vent valve 42 preferably comprises a molded plastic fuel resistant material described above or any other suitable material. The valve head 42*c*, sealing surface 42*a*, axle 44, neck, 45, and arm 47 can be integrally molded from such plastic material.

Figure 5:
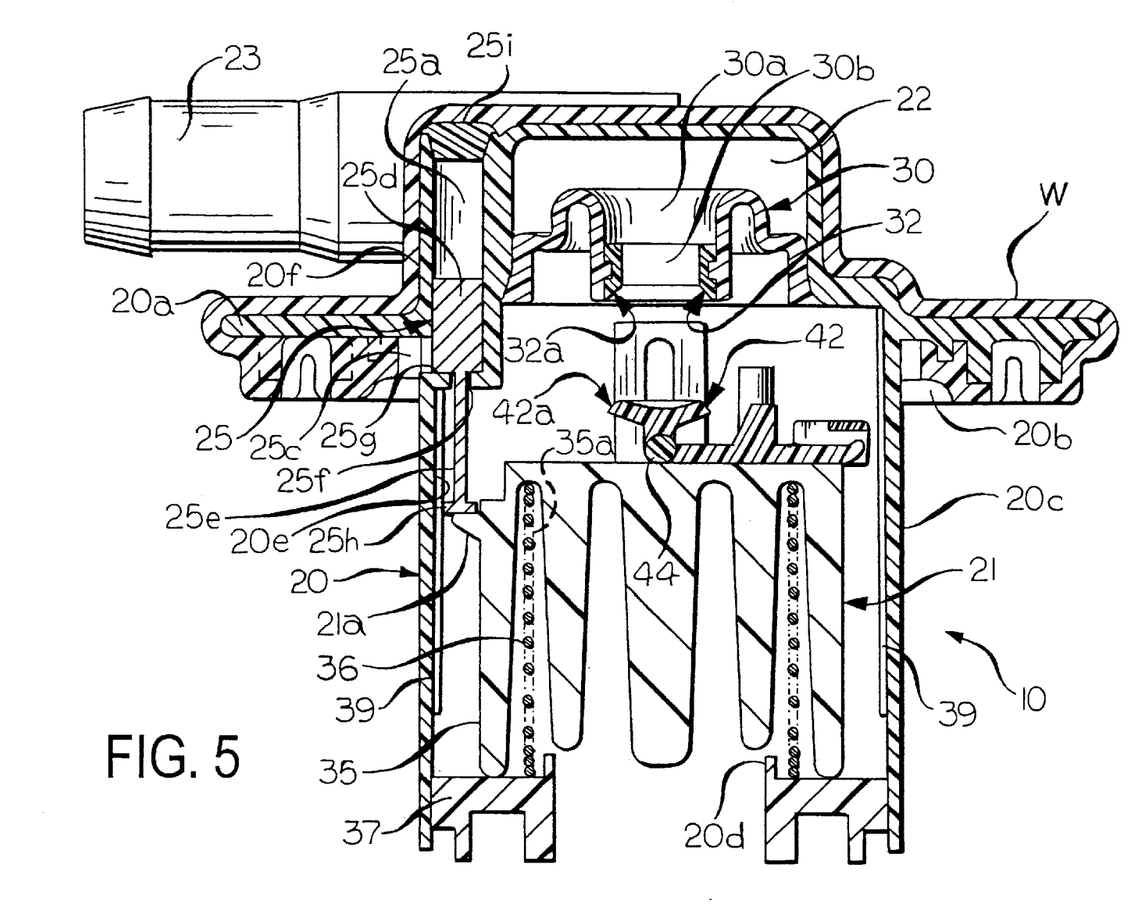
FIG. 5 is a cross-sectional view of a fill limit vapor valve assembly taken along line A—A of FIG. 4 when a bypass valve of the invention is in a downward position, thereby preventing fuel vapor from passing through a vent opening in the housing skirt.

In operation, when the float 35 is positioned in the housing 20 in its downward position by virtue of a low fuel level in the tank 12, the vent seat 32 is open to vent fuel vapors from the fuel tank 12 through vent opening 22. The vent valve 42 will reside on the top surface of the float 35 with the valve arm 47 parallel to the top of the float, as shown in FIG. 5. In addition, the rod 25*b* of the bypass valve 25 is positioned in its downward position with the seat portion 25*h* positioned above the shoulder 21*a* of the float 35. The upper portion 25*d* of the rod 25*b* is positioned at a depth in the passage 25*a* to completely block the vent opening 25*f* and prevent flow of fuel vapor or liquid fuel from the fuel tank 12 through the vent opening 25*f*.

Figure 6:
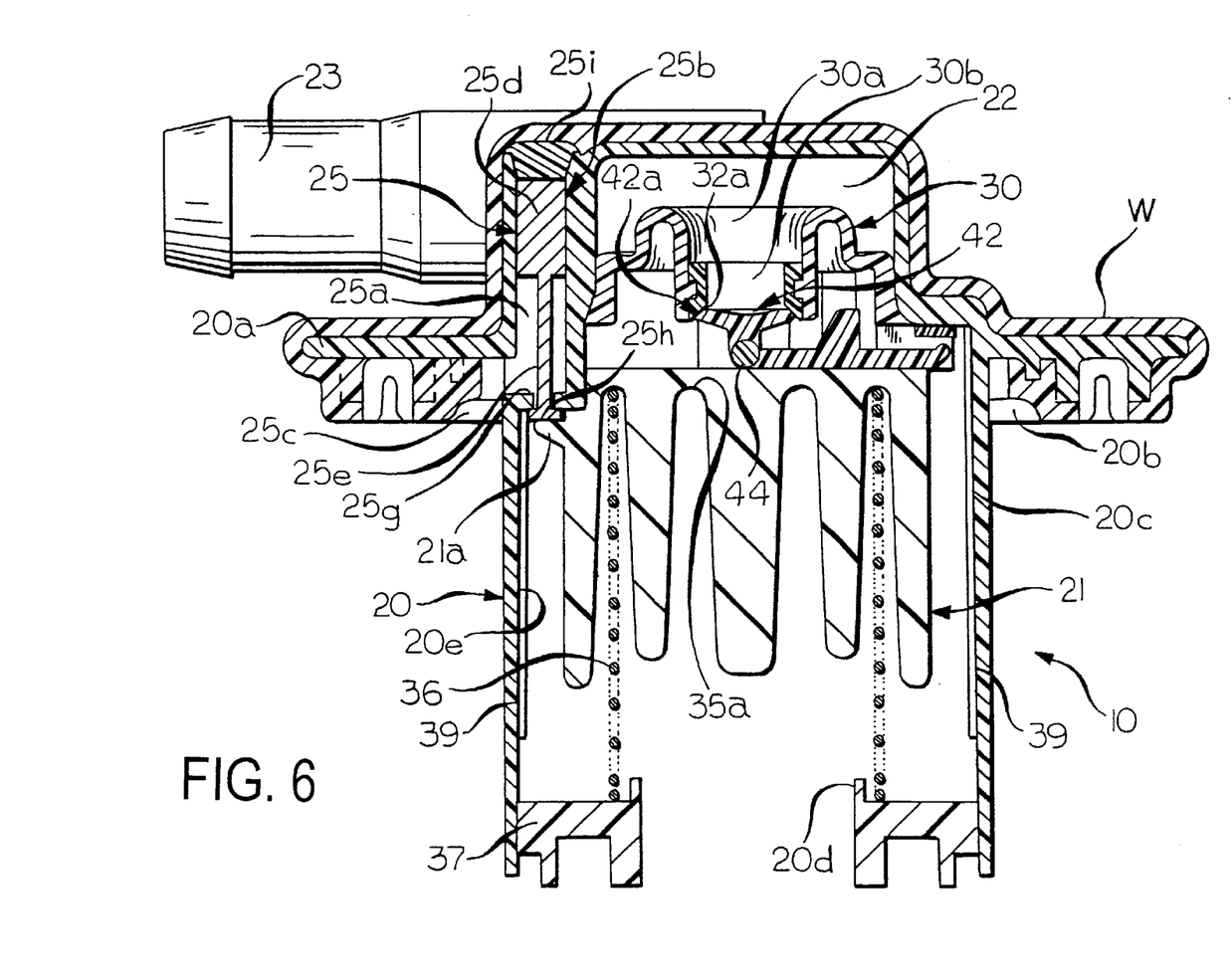
FIG. 6 is a cross-sectional view of a fill limit vapor valve assembly taken along line A—A of FIG. 4 when the bypass valve of the invention is in a upward position, thereby allowing fuel vapor to pass through the vent opening in the housing skirt.

Referring now to FIG. 6, as the float 35 travels in an upward direction in the presence of liquid fuel (or during rollover), the partial spherical sealing surface 42*a* of the valve 42 will eventually mate with the sealing surface 32*a* of the valve seat 32. The mating relationship effects a circumferential line of contact liquid/vapor tight seal therebetween to close off the vent opening 22 and prevent flow of fuel vapor or liquid fuel to canister 14.

Another aspect of the invention is that the upward direction of travel of the float 35 causes the rod 22*b* of bypass valve 25 to travel upward within the passage 25*a*. In this position, the upper portion 25*d* of the rod 25*b* no longer blocks the vent opening 25*f* and allows bypass flow of fuel vapor from the fuel tank 12 through the vent passage 25*c*. The shape of the bypass valve and size of the related vent passages are configured to eliminate overfilling the tank during refueling operations and provide sufficient vent flow passage to minimize tank pressure after refueling.

Figure 7:
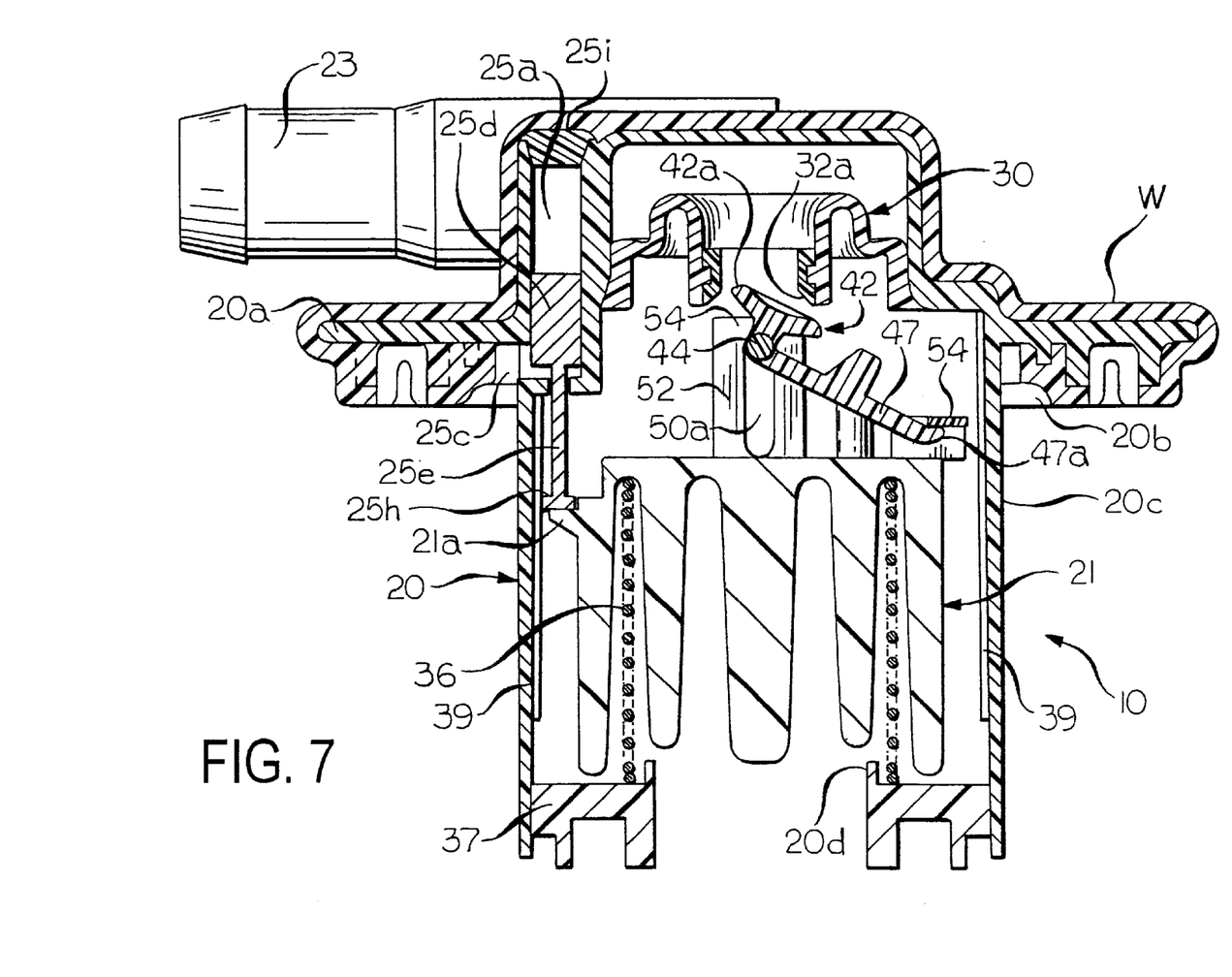
FIG. 7 is a cross-sectional view of a fill limit vapor valve assembly taken along line A—A of FIG. 4 when the bypass valve is between the downward and upward positions, thereby varying the size of the vent opening and controlling the flow rate of fuel vapor through the vent opening in the housing skirt.

Referring now to FIG. 7, as the float 35 travels in the downward direction after the sealing surfaces 42*a*, 32*a* have been in sealing relation, the effective weight of the float 35 will be transmitted through the L-shaped arm 54 of the float as a downward load or force on the upturned end 42*a* of the valve arm 47 extending radially from the valve axle 44. The downward load will cause the vent valve 42 to rotate about axis, A, of the axle 44 and center, C, so that valve sealing surface 42*a* rotates relative to the seat sealing surface 32*a*, the slots 50*a*, 50*b* of the float maintaining the axle 44 in proper position as described above. Rotation of the vent valve 42 will occur once the load on the arm 47 provides sufficient moment to overcome the static friction of the circumferential line of contact between the valve and valve seat sealing surfaces 42*a*, 32*a*. The magnitude of the static friction is directly related to the vapor pressure level in the fuel tank 12.

Once static friction is overcome, rotation of the vent valve 42 will occur with less load on the arm 47 because the force required to overcome dynamic friction is less than that needed to overcome static friction. As the vent valve 42 rotates in valve seat 32, a vapor flow passage 55 is created between the valve and valve seat surfaces 42*a*, 32*a* and lowers the tank vapor pressure and thus reduces the pressure differential across the vent valve 42, reducing the downward load required to axially pull the valve 42 from the seat 32. The configuration of the vapor flow passage will depend on the particular configuration of vent valve 42 and valve seat 32.

Once the vent valve 42 has rotated a small number of degrees dependent on valve geometry, the weight of the float 35 will be transmitted as a downward load to the valve axle 44 by the upper end wall 50c, 50d of the slots 50a, 50b of the float. The weight of the float 35 will be selected sufficient to axially pull the vent valve 42 from the seat 32, thus reopening the vent opening 22 to allow fuel vapor flow to the canister 14.

Another aspect of the invention is that the downward travel of the float 35 from its upward position causes the rod 25b of bypass valve 25 to travel downward in the orifice 25a. This downward travel causes the upper portion 25d of the rod 25b to begin to block a portion of the vent opening 25f. As the rod 25b continues to travel downward, the effective size of the vent opening 25f becomes smaller and smaller, thereby controlling the flow rate at which fuel vapors are permitted to flow through bypass valve vent passage as the float 35 travels downward.

Similarly, the upward travel of the float 35 from its downward position causes the rod 25b of bypass valve 25 to travel upward in the orifice 25a. This upward travel causes the upper portion 25d of the rod 25b to expose a portion of the vent opening 25f. As the rod 25b continues to travel upward, the effective size of the vent opening 25f becomes larger and larger, thereby controlling the flow rate at which fuel vapors are permitted to flow through vent opening 25f as the float 35 travels upward.

The present invention is advantageous to provide a fill limit vapor valve assembly for a vehicle fuel tank that overcomes the problem of too large or too small of vent openings for venting fuel vapors from the fuel tank while maintaining appropriate pressure in the fuel tank.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A fill limit vapor assembly for a vehicle fuel tank for venting fuel vapor from the fuel tank to a fuel vapor emission device disposed external of the fuel tank, said assembly comprising:
   a housing having a first and second vent openings communicating in series with the interior of said fuel tank and with said fuel vapor emission device;
   a float disposed in said housing for closing and opening the first vent opening, the float capable of moving in response to a level of fuel; and
   a bypass valve in said housing for varying a size of said second vent opening, thereby controlling a flow rate of fuel vapor from the fuel tank to the fuel vapor emission device.

2. The assembly of claim 1, wherein said bypass valve comprises a vertical passage enveloping a weighted metering rod.

3. The assembly of claim 2, wherein said weighted metering rod includes a substantially cylindrical upper portion, a substantially cylindrical bottom portion, and a seat portion that rests on a shoulder of said float.

4. The assembly of claim 3, wherein said substantially cylindrical upper portion is positioned at an elevation above said second vent opening when said float is positioned in an upward position, thereby allowing fuel vapor to pass through said second vent opening.

5. The assembly of claim 3, wherein said substantially cylindrical upper portion is positioned at approximately the same elevation as said second vent opening when said float is positioned in a downward position, thereby preventing fuel vapor to pass through said second vent opening.

6. The assembly of claim 3, wherein said substantially cylindrical upper portion is positioned so as to expose a portion of said second vent opening when said float is between said upward and downward positions, thereby varying a flow rate of fuel vapors from said fuel tank.

7. The assembly of claim 1, further comprising a fill limit vapor valve disposed on said float for closing and opening said first vent opening.

8. A method of controlling a flow rate of fuel vapors from a fuel tank to a fuel vapor emission device disposed external to the fuel tank, comprising the steps of:
   providing a housing having first and second vent openings communicating in series with the interior of the fuel tank and with the fuel vapor emission device;
   providing a float disposed in the housing for closing and opening the first vent opening, the float capable of moving in response to a level of fuel;
   controlling a flow rate of fuel vapor from the fuel tank to the fuel vapor emission device by providing a bypass valve in the housing that varies a size of the second vent opening.

9. The method of claim 8, wherein said controlling step is performed by positioning a portion of a weighted metering rod at an elevation relative to the second vent opening.

10. A fill limit vapor valve assembly for a vehicle fuel tank for venting fuel vapor from the fuel tank to a fuel vapor emission device disposed external of the fuel tank, said assembly comprising:
    a housing having a first and second vent openings communicating in series with the interior of said fuel tank and with said fuel vapor emission device,
    a float disposed in said housing for closing and opening the first vent opening, the float capable of moving in response to a level of fuel, and
    a bypass mechanism positioned in said housing for varying a size of said second vent opening, thereby controlling a flow rate of fuel vapor from the fuel tank to the fuel vapor emission device.

11. The assembly of claim 10, wherein said bypass mechanism comprises a vertical passage enveloping a weighted metering rod.

12. The assembly of claim 11, wherein said weighted metering rod includes a substantially cylindrical upper portion, a substantially cylindrical bottom portion, and a seat portion that rests on a shoulder of said float.

13. The assembly of claim 12, wherein said substantially cylindrical upper portion is positioned at an elevation above said second vent opening when said float is positioned in an upward position, thereby allowing fuel vapor to pass through said second vent opening.

14. The assembly of claim 12, wherein said substantially cylindrical upper portion is positioned at approximately the same elevation as said second vent opening when said float is positioned in a downward position, thereby preventing fuel vapor to pass through said second vent opening.

15. The assembly of claim 12, wherein said substantially cylindrical upper portion is positioned so as to expose a portion of said second vent opening when said float is between said upward and downward positions, thereby varying a flow rate of fuel vapors from said fuel tank.

16. The assembly of claim 10, further comprising a fill limit vapor valve disposed on said float for closing and opening said first vent opening.

17. A method of controlling a flow rate of fuel vapors from a fuel tank to a fuel vapor emission device disposed external to the fuel tank, comprising the steps of:

providing a housing having first and second vent openings communicating in series with the interior of the fuel tank and with the fuel vapor emission device;

providing a float disposed in the housing for closing and opening the first vent opening, the float capable of moving in response to a level of fuel;

controlling a flow rate of fuel vapor from the fuel tank to the fuel vapor emission device by providing a bypass mechanism in the housing that varies a size of the second vent opening.

18. The method of claim 17, wherein said controlling step is performed by positioning a portion of a weighted metering rod at an elevation relative to the second vent opening.

* * * * *